Nov. 6, 1934.  S. STEPKIN  1,979,501

COOKING DEVICE

Filed Dec. 3, 1930

INVENTOR,
Samuel Stepkin;
ATTORNEY

Patented Nov. 6, 1934

1,979,501

UNITED STATES PATENT OFFICE 1,979,501

COOKING DEVICE

Samuel Stepkin, Los Angeles, Calif., assignor to Samuel Bloomfield

Application December 3, 1930, Serial No. 499,627

5 Claims. (Cl. 219—35)

This invention relates to cooking devices.

More particularly, the invention has to do with a form of cooker adapted to handle meats.

An object of the invention is the provision of a cooker which will thoroughly cook the meat and not leave any meat that is rare.

A further object is the provision of a cooker in which the surface of the meat may be cooked so that air is not capable of penetration into the uncooked portion of the meat.

No particular character of article to be cooked is contemplated, although I have designated in my objects that the cooker is adapted to handle meats. Meat tends to shrink under influence of heat, particularly where the meat is cooked from the surface inwardly. However, I provide means whereby the meat is likewise heated interiorly which, when combined with the exterior heat, acts to prevent shrinkage and to maintain all the vitamines within the meat.

Another object is the provision of a cooker in which the degree of cooking may be regulated within any desired limit.

Another object is the provision of a cooker which may bake or cook various substances other than meat heretofore mentioned without losing any of the flavor of the article being cooked. Where meat is roasted, the juice from the meat often escapes, with the result that the meat is not so tender as it might be. To overcome this, the surface of the meat is often seared prior to baking. The present invention, however, is so arranged that the aqueous portions of the articles being cooked are retained within said article, with the result that the flavor of the article is not lost but is preserved.

Another object is the provision of a cooker which is novel of construction, simple of manufacture, and generally superior to the ordinary type of roasters or cookers.

With the above and other objects in view, the invention consists in the novel and useful provision, formation, construction, association, and relative arrangement of parts, members and features, all as shown in a certain embodiment in the accompanying drawing, described generally, and more particularly pointed out in the claims.

Figure 4:
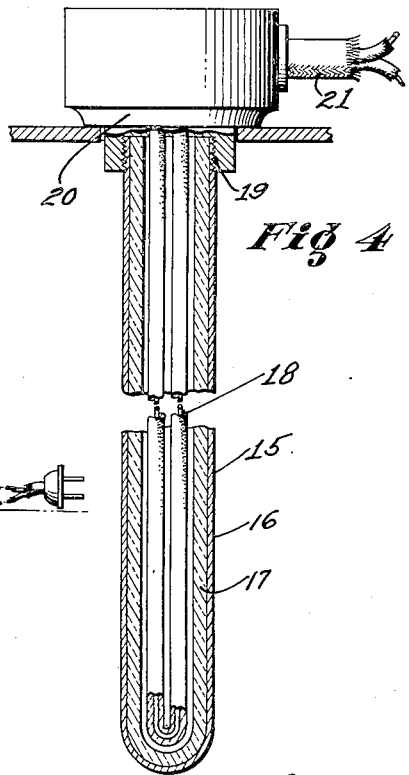
Figure 2:
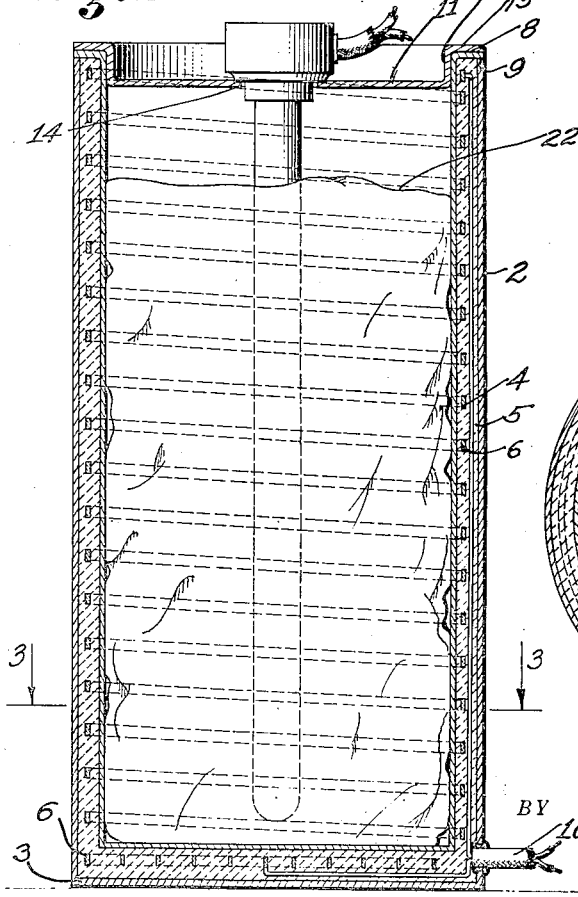
Figure 2 is a longitudinal sectional view of the cooker shown in Figure 1 and detailing the construction thereof.

Referring to the drawing, the cooker 1 includes an outer casing 2 having a base 3 and a casing 4 spacedly held within the outer casing 2 and substantially concentric therewith. The two casings form a jacket, the annular space therebetween being adapted to receive some form of insulating substance 5 adapted to have embedded therein wire 6. This construction is likewise true for the base portion, as shown at 7. This wire is of the resistance type, such as used in electrical heating appliances. In the present instance, the wire is of the "flat" type. The inner casing is provided with an annular outwardly extending flange 8, whereby it may be joined with the upper end 9 of the casing 2. An electrical conduit 10 communicates near the base of the casing with the heating wires enclosed within the insulating material 5. A cap 11, provided with upwardly and outwardly extending flanges 12 and 13, respectively, is adapted to be in part received within the confines of the inner casing member 4 and to rest upon the flange 8. This cap is formed with a central opening 14. A second heating element 15 is adapted to longitudinally depend from the cap and within the casing, as illustrated in Figure 2. This central heating element 15 includes an elongated casing 16, within which is insulating substance 17. Electrical heating wires 18 extend throughout the length of the casing 15, as best shown in Figure 4. The upper end of the casing is screw-threaded at 19 to a supporting block 20. An electrical conduit 21 enters said supporting block and connects with the electrical heating element 18. This supporting block is adapted to rest upon the cap 11 when the casing 17 is depending centrally within the casing 4.

Figure 1:
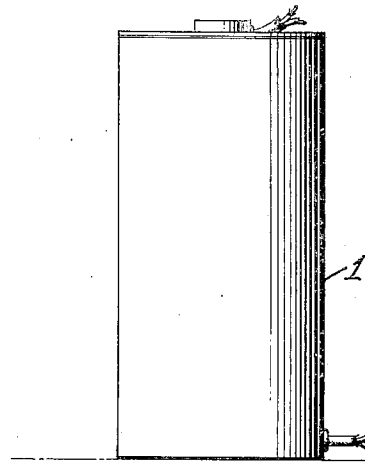
Figure 1 is a side elevation of one form of cooker embodying the invention.
Figure 3:
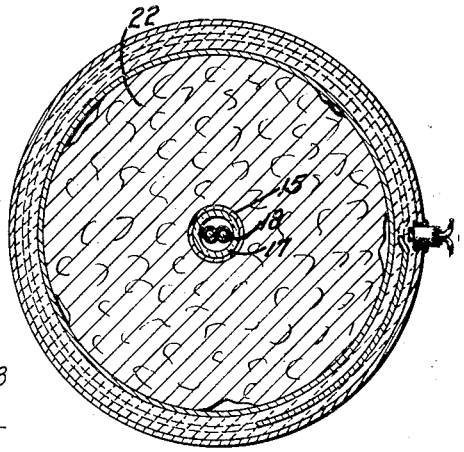
Figure 3 is a transverse sectional view on the line 3—3 of Figure 2, and, Figure 4 is a longitudinal sectional view of one of the cooker elements.

The operation, uses and advantages of the invention just described are as follows:

If we assume that meat is to be baked or cooked, the meat is first placed within the inner casing 4, as indicated at 22 in Figures 2 and 3. After this is done, the cap 11 is placed in position, as shown in Figure 2, and the heating element 15 is forced through the center of the meat, as shown in Figure 2. Means for supplying current to the heating elements may be provided in several ways, such as through the medium of a step-down transformer, shown in Figure 1 at 23. I may provide any number of transformers to regulate the voltage output and in accordance with the degree of heat desired for the article being cooked, likewise including time duration. Thus, if I should use 6-volt output, the heating elements would not be so hot as they would be under a 12-volt output, as may be easily realized. Some articles require long slow baking or cooking and thus, the transformer arrangement will permit for nicety of adjustment. I also may, within the spirit of the invention, utilize other means, such as rheostats for regulating the current supply to the heating elements.

This invention is not to be confused with the ordinary type of waffle iron, and the like, which consist substantially in a pair of flat plates formed of protuberances and adapted to bake some flat material. To the contrary, this invention is of considerable size and is for use in cafés and factories where large amounts of meat and other substances are to be cooked. As many as five to ten of these cookers may be operating at the same time.

The device essentially consists in what may be termed a closed container heated through the medium of an electric current with means for regulating the degree to which said container is heated through the medium of rheostats, transformers or the like. Furthermore, the invention contemplates the provision of a central electrode heating element so that the article being cooked is heated both exteriorly and interiorly. This construction allows for uniform baking. Quite obviously, without the provision of the central heating element, the baking would not be uniform if the article being baked was of considerable thickness.

It is a simple matter to remove the cooked article after a baking thereof by removing the cover and the central heating element and turning the container upside down. Most articles when cooking contract rather than expand so that the article very easily drops from the container. Furthermore, the inner container may be greased.

I have found in actual practice that where meat or other substances are cooked from the exterior inwardly shrinkage occurs and the tastiness of the article being cooked is, in a measure destroyed. A very important feature of the invention consists in the center electrode or heating element which is pushed downwardly through the substance to be cooked so that the substance to be cooked, if it is meat, is heated not only from the inside toward the surface thereof but likewise the heat is being directed from the surface inwardly. This method of cooking results in maintaining the flavor of the article being cooked and preserving the vitamines, a feature of great importance because, in the average cooking, the vitamines are in a measure destroyed.

In cooking a shoulder of lamb or a large piece of ham, the meat is placed within the container, the central heating element pushed therethrough, and the cap replaced, whereupon the degree of heat desired may be readily regulated through the medium of the transformers or rheostats as heretofore set forth.

I have not specified any particular type of resistance wire nor have I specified any particular type of insulating material for use in the device, although it is evident that any material, such as asbestos and any of the well known wires may be used.

It is obvious that various changes and modifications and variations may be made in practicing the invention in departure from the particular showing of the drawing without departing from the true spirit of the invention.

I claim:

1. A cooker adapted to hold food bulk, comprising an elongated casing, electrical heating elements throughout the length of said casing, a cap for said casing, and a penetrator for the food bulk constituting a central electrical heating element depending from said cap and longitudinally of said casing.

2. In a cooker adapted to hold food bulk, a container comprising an outer casing having a base portion, an inner casing spaced from the outer casing and having a base portion, electrical heating elements between said casings, a penetrator for the food bulk constituting cap for the container, and an elongated heating element depending from said cap and axially of the casings.

3. A cooker adapted to hold food bulk including an elongated casing, electrical heating elements for said casing, a cap for closing one end of said casing, formed with a central opening, a penetrator for the food bulk constituting an elongated electrical heating element provided with a supporting means, said penetrator being adapted to be passed through the central opening of the cap, the supporting means resting on said cap for maintaining said penetrator removably within the casing.

4. A cooker adapted to hold food bulk including an elongated casing, electrical heating elements throughout the length of said casing, a cap for one end of said casing, formed with a central opening, a penetrator for the food bulk constituting an electrical heating element, a supporting block secured to one end of said penetrator, said penetrator being adapted to be passed through the central opening of the said cap and said supporting block being adapted to rest on the cap for maintaining the penetrator in position of service within the casing; said supporting block having an annular flange for passage through the opening of the cap, and an enlarged portion adapted to rest on the cap and overlap the opening in said cap.

5. A cooker adapted to hold food bulk including an elongated annular container comprising spaced outer and inner concentric casings, electrical heating means confined in the annular space between said casings, a cap formed with a central opening fitted over one end of said container, and an electrical heating element in the form of a food penetrator constructed and arranged to be inserted through said cap opening into said container, to extend substantially the length of the container, or withdrawn through said opening from said container.

SAMUEL STEPKIN.